Oct. 1, 1963

R. N. JOLLY 3,105,568

SEISMIC PROFILING SYSTEM

Filed Dec. 7, 1959

Richard N. Jolly   Inventor

By James E. Reed   Attorney

United States Patent Office

3,105,568
Patented Oct. 1, 1963

3,105,568
SEISMIC PROFILING SYSTEM
Richard N. Jolly, Tulsa, Okla., assignor to Jersey Production Research Company, a corporation of Delaware
Filed Dec. 7, 1959, Ser. No. 857,864
13 Claims. (Cl. 181—.5)

The present invention relates to seismic methods for investigating geological structures underlying the earth's surface and more particularly relates to an improved method for obtaining continuous multiple subsurface coverage during seismic profiling operations. In still greater particularity, the invention relates to an improved system for initiating and detecting seismic impulses in order to obtain continuous multiple coverage which is more effective than systems employed in the past.

It is known that geographical areas vary greatly with respect to the reflection quality obtained during seismic profiling operations. In some areas, reflection quality is high and hence it is not difficult to identify seismic events upon records prepared in those areas. In other regions where reflection quality is poor, seismic records can often be interpreted only with difficulty, if at all, primarily because of obscuring noise generated in complex, near-surface layers. Random waves, surface waves and multiple reflections received from near-surface intervals bounded by strata having high reflection coefficients tend to obscure correlation peaks in signal amplitude designating subsurface discontinuities and prevent their detection. Methods normally used to eliminate horizontally-traveling surface noise and other near-surface phenomena generally produce only limited improvements in seismic data where the noise level is extremely high or where the interfering waves have substantially vertical directions of travel.

The method to date found most effective for improving reflection quality during seismic profiling operations involves the use of a plurality of seismic detectors or geophones and the combining of signals from these in order to produce a composite record. By properly spacing the geophones and shot points, much of the unwanted energy in the signal can be eliminated. In order to obtain reliable results in this manner, it is generally preferable that energy from common points on the reflecting horizons be combined. A number of procedures for obtaining common depth point seismic coverage during profiling operations have been developed. These procedures in general have not been wholly satisfactory because they require that special equipment and special data processing techniques be used in the field and are therefore impractical or because they call for continual shifting of the geophones and shooting equipment back and forth and for this reason are uneconomical.

The present invention provides a new and improved method for obtaining common depth point coverage during seismic profiling operations which is relatively free of the disadvantages which have characterized methods utilized to accomplish this in the past. Specialized equipment, complex field data processing techniques and movement of the crew and equipment back and forth over the operation are not required. In carrying out the method of the invention, a plurality of seismic detectors or geophones are first positioned at equally spaced stations along a line on the earth's surface, a series of seismic impulse points are located along the same line or a line parallel to the line of detectors, an impulse is initiated at each of the impulse points, and the energy picked up by each of the detectors in response to each impulse is recorded. After the subsurface coverage thus provided has been obtained, the line of the geophone stations is extended by transferring instruments from one end of the line to the other. The line of impulse points is then moved in the same direction by locating a second group of points. Impulses are initiated at each of the points in the second group and the wave energy detected at each of the geophone stations in response to these later impulses is recorded. By continuing to extend the line of geophone stations and the line of impulse points in this manner, data for a continuous multiple profile based upon common depth points are obtained.

The number of geophone stations employed at any one time in practicing the invention may be varied widely. Practical considerations will generally dictate the use of from about 12 to about 48 stations but a greater or lesser number may be utilized if desired. A single geophone or a group of geophones electrically connected in multiple may be positioned at each station. If groups of geophones are used, as will generally be the case, each group should be centered linearly or areally on one of the stations.

The line of impulse points may be located adjacent to the line of geophone stations, displaced a short distance transversely in order to avoid hole disturbances, or instead may either precede or follow the line of geophone stations. The number of impulse points in each group of points will usually be equal to or less than the number of geophone stations in use at any one time. From 2 to 24 points in each group is preferred. These points are not necessarily evenly spaced along the line but the basic pattern used should be repetitive. Shot points in the pattern may be omitted if it is desired to reduce the multiple coverage obtained or if surface conditions necessitate it. One impulse may be initiated at each impulse point or instead a plurality of impulses may be simultaneously initiated at each point. In the latter case, a series of explosive charges may be spaced vertically in a single shot hole and detonated simultaneously or charges placed in individual holes about the impulse point may be used. The method of the invention is not limited to the use of explosive charges for initiating the necessary impulses, however. Weights dropped on the surface, engines having wheels or gears provided with eccentric weights, various types of vibrators and other devices for generating seismic impulses may be employed.

The line of geophone stations and the line of impulse points are always advanced in the same direction and in one direction only. The length of the portion of the geophone spread moved in order to advance the line of geophone stations must equal the length of each group of impulse points if continuous multiple subsurface coverage is to be obtained and if duplicate impulses producing no new coverage are to be avoided. It is generally convenient to space the impulse points in each group so that each group is half as long as the line of geophone stations in use. One-half of the geophone spread will then be moved each time the line of geophone stations is advanced.

The wave energy detected at the geophone stations in response to each impulse initiated may be recorded by means of any of a variety of recording systems utilized in seismic prospecting operations. In general it will be preferred to record the original signals upon magnetic tape but other systems, including oscillographic, variable area, variable density and variable color systems may be used. Such systems are well known to those skilled in the art.

The data recorded as described above can readily be summed to produce a record based upon multiple subsurface coverage by combining the geophone signals representing energy reflected from common depth points. The usual corrections to compensate for the distances and differences in elevation between the geophones and the impulse point will be applied in the conventional manner before the signals are added. Each signal may also be filtered to eliminate ground roll, wind effects, power line interference and noise before the composite record is prepared. Any of a number of conventional methods for combining signals may be utilized. In most cases it will be found convenient to first record the geophone signals upon magnetic tape or a similar reproducible recording medium and to thereafter play back the signals, apply the necessary corrections and combine them upon a photographic medium as variable area, variable density or oscillographic traces. Many recording and transcribing units which readily permit such operations are available from commercial sources.

The method of the invention is considerably more attractive from an economic standpoint than many of the methods proposed in the past in that it can be carried out with conventional seismic prospecting and recording equipment. No specialized data processing techniques are required and hence the lengthy computations which characterize many systems proposed in the past are unnecessary.

A further important advantage of the method of the invention lies in the fact that the geophones and impulse points are always moved in the same direction in an orderly fashion. Field crews are not required to continually shift geophones, shooting trucks and other equipment back and forth over the length of the array. Considerably greater distances can therefore be covered each day than are possible with many other common depth point profiling systems.

Still another advantage of the method is that it permits the geophone stations to be offset from the impulse points if desired. By starting the line of impulse points either in front of or behind the line of geophone stations, rather than adjacent to it, the energy reflected from subsurface horizons can always be detected from the same direction. The initial geophone station and the initial impulse point may be any desired distance apart. In areas where the horizons rise over long distances, advantage can thus be taken of the fact that shooting up-dip, particularly with long spread distances such as those employed in accordance with the invention, generally produces better record quality than does shooting down-dip. If desired, the impulse points can be spaced unevenly so that for each common depth point the impulse-to-detector distances vary in a uniform manner and the differences between the squares of the distances is a constant. This is particularly effective as a means for obtaining cancellation of multiple reflections.

The method of the invention can be utilized to achieve very long effective trace coverage and therefore the signal-to-noise ratio obtained is much better than that of conventional systems. Variations due to differences in conditions under which the impulses are generated are averaged out and become much less important than in ordinary profiling operations. Multiple reflections can be reduced when long spread distances are used in conjunction with non-linear shot spacing and improved reflection continuity and detail are obtained. For these reasons, the method of the invention is particularly attractive in areas where the signal-to-noise ratio is so low as to make interpretation doubtful, in good reflecting areas where increased detail and accuracy are required for stratigraphic interpretation, and in areas where multiple reflections or other interferences obscure weak, discontinuous deep reflections.

The exact nature and objects of the invention can best be understood by referring to the following detailed description of a seismic profiling operation carried out in accordance therewith and to the accompanying drawing in which.

Figure 1:
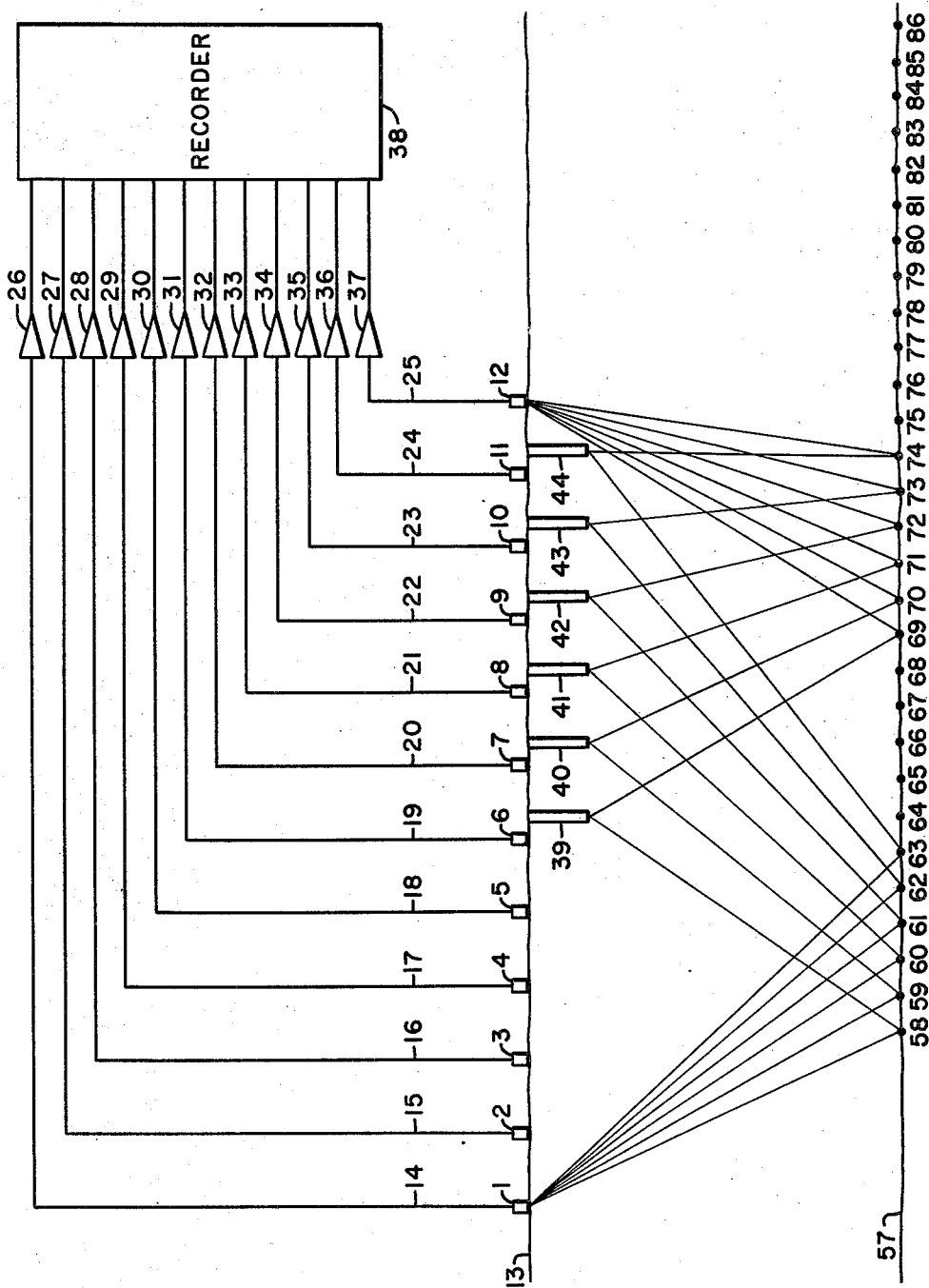
FIG. 1 is a schematic representation of apparatus utilized in carrying out the process of the invention.

Turning now to FIG. 1, reference numerals 1 through 12 designate seismic detectors or geophones spaced at equal intervals along a straight line on the earth's surface, represented by line 13. The detectors employed may be dynamic geophones, variable reluctance geophones, or other transducers of conventional design capable of translating seismic wave energy into electrical currents which can subsequently be amplified and recorded. Depending upon the type of geophones employed, the instruments may be partially embedded in the earth in order to assure proper coupling or may be merely placed upon the surface. The spacing of the stations is not highly critical but it is preferred that they be equidistant from one another. For most purposes, geophone station spacings of from about 100 feet to about 500 feet will be satisfactory. In place of a single geophone at each station as shown in FIG. 1, a plurality of interconnected geophones distributed in-line or areally about each detection point may be utilized. The use of multiple geophones in this manner serves to reduce noise and improve the quality of the final record. Each geophone or group of geophones utilized is attached to a geophone cable. Although a single cable having multiple conductors is normally employed, individual conductors are shown in FIG. 1 for the sake of clarity. These are identified by reference numerals 14 through 25. As will become apparent hereafter, the geophones may be divided into two groups and a separate cable may be used for each group in order to facilitate their handling during a profiling operation carried out in accordance with the invention.

The geophones are connected by means of conductors 14 through 25 to amplifiers 26 through 37 which serve to amplify the signal from each geophone or group of geophones associated with each detection point. Conventional amplifiers may be employed. The output signals obtained from the amplifiers are then recorded by means of recording device 38. A magnetic tape recorder will preferably be employed to record the amplified signals in the field. Recorders which produce visual or graphic records may, however, also be used. A number of suitable recording devices of the latter type are well known and widely employed. These include oscillographic recorders which produce a sinusoidal type trace, variable area recorders which yield a record upon which the area of the trace varies with variations in signal amplitude, and variable density recorders from which tracers varying in intensity with variations in signal amplitude are obtained. Recording devices which produce records indicating changes in signal frequency rather than or in addition to changes in signal amplitude may also be employed.

As shown in FIG. 1 of the drawing, seismic impulse points 39 through 44 have been located adjacent to geophones 6 through 11. Although these impulse points will hereafter be referred to as shot points, it will be understood that the method of the invention is not restricted to operations wherein dynamite or a similar explosive is used to generate seismic impulses. It may also be used where weight is dropped onto the earth to generate the necessary impulse or where other techniques are employed. Shot points 39 through 44 are located upon a straight line adjacent to the line of geophones and are spaced at intervals equivalent to the intervals between the geophones. If groups of geophones are utilized in place of the individual geophones shown in FIG. 1, each shot point will preferably be adjacent to the center of a group of geophones and displaced a short distance transversely in order to avoid hole disturbances. If only one geophone is utilized at each station, each shot point will preferably be near or adjacent to a geophone but located far enough away to avoid hole disturbances. The method is not limited to the use of 12 geophone stations and 6 shot points as shown in FIG. 1, however. Any number of geophone stations and shot points consistent with the multiple coverage desired may be used. It will generally be preferred to employ from about 12 to about 48 geophone stations and to use from 2 to about 24 shot points in each group of shot points. The division of the shot points into groups will be explained in detail hereafter.

In carrying out a seismic profiling operation utilizing the apparatus shown in FIG. 1 of the drawing, seismic impulses are first generated at each of the shot points. As pointed out earlier, multiple impulses initiated simultaneously at different levels in a shot hole or at points surrounding the preselected impulse point may be utilized. The necessary impulses may be generated by the detonation of explosive charges in shot holes drilled at the shot points, by the dropping of weights onto the earth at the shot points or by means of a vibrator or a similar device positioned at the shot points. The time intervals between impulses should be sufficiently long to insure that energy from the successive impulses is not simultaneously detected. Normally a period of at least about 6 seconds should elapse between successive impulses. Elastic waves generated at each of the shot points will travel outwardly from each of the points in all directions. A portion of the wave energy transmitted downwardly into the earth will be reflected back to the surface when it encounters a subsurface discontinuity such as that represented by line 57 in FIG. 1.

The wave energy reflected back to the surface as a result of each impulse is detected by geophones 1 through 12 and subsequently recorded. The points on discontinuity 57 from which energy will be reflected to the surface will depend upon the position of the shot point with respect to the detection point on the surface. Thus in FIG. 1, energy originating at shot point 39 and detected by geophone 1 will have been reflected from point 58 on discontinuity 57. Energy detected by geophone 2 in response to an impulse at point 39 will have been reflected from point 59 on discontinuity 57 along a path not shown in the drawing. Each of the other geophones will simultaneously detect energy reflected from a particular point on the reflecting horizon in response to the impulse at point 39. The total coverage obtained as a result of the impulse at point 39 will thus extend from point 58 to point 69 on discontinuity 57.

When the second impulse in the series is initiated at shot point 40 in FIG. 1, each of the geophones will again detect wave energy reflected from discontinuity 57. Because shot point 40 is displaced from point 39, the point on the reflecting horizon from which energy is reflected to geophone 1 will also be displaced. Assuming that the surface and reflecting horizon are generally parallel to one another as shown in FIG. 1, the amount of this displacement will equal one-half the distance separating adjacent geophones on the surface. It will be seen that this is the same as the distance separating adjacent points on horizon 57 from which wave energy was reflected to adjacent geophones in response to the impulse at point 39. The energy detected at geophone 1 in response to the impulse at point 40 will therefore be reflected from point 59. Point 59 on horizon 57 is thus a common depth point with respect to the signal obtained from geophone 2 in response to the impulse at point 39 and the signal obtained from geophone 1 in response to the impulse at point 40. In like manner, points 60 through 69 are also common depth points with respect to reflected energy transmitted from shot point 39 to geophones 3 through 12 and that transmitted from shot point 40 to geophones 2 through 11. The subsurface coverage afforded by the impulse initiated at shot point 40 extends from point 59 to point 70 on reflecting horizon 57. Additional coverage is obtained as a result of each of the succeeding impulses as shown in the drawing.

Figure 2:
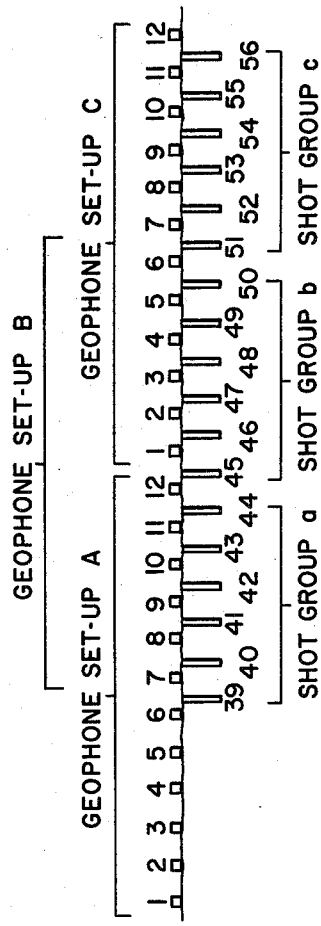
FIG. 2 shows schematically the relationship between geophone location and seismic impulse points during a profiling operation carried out in accordance with the invention.

FIG. 2 of the drawing illustrates the method by which the profiling operation carried out in accordance with the invention is continued after seismic impulses have been initiated at each of the shot points shown in FIG. 1. The initial position of the geophones as represented in FIG. 1 is referred to as geophone setup A in FIG. 2. The initial shot points 39 through 44 are designated as shot group $a$ in FIG. 2. Upon completion of the recording operation utilizing geophone setup A and shot group $a$, the line of geophones is extended in the direction in which the profiling operation is to advance by moving geophones 1 through 6 beyond geophones 7 through 12. The same spacing between geophones or groups of geophones as was employed earlier is maintained. This shift of the geophones results in geophone setup B as shown in FIG. 2. The line of shot points is extended in similar manner by locating shot points 45 through 50. The new shot points, referred to as shot group $b$, are equally spaced and each is adjacent to a geophone or group of geophones. Impulses are initiated at each of the shot points in succession and the wave energy resulting from each impulse is recorded on geophones 7 through 6 making up geophone setup B. Multiple common depth point coverage is again obtained. The operation may then be advanced again by shifting geophones 7 through 12 ahead of geophones 1 through 6 to establish geophone setup C and by locating new shot points 51 through 56 to constitute shot group $c$.

From the foregoing it will be seen that the line of geophones and the line of shot points are continuously advanced in a single direction. Half the geophones are moved each time the line of geophones is extended. It will generally be preferred to utilize two separate geophone cables, one for geophones 1 through 6 and one for geophones 7 through 12, in order to avoid the necessity for disconnecting and subsequently reconnecting the geophones for each setup. The shot points are equally spaced on a continuous line and, if shot holes are used, they may be drilled well in advance of the shooting operation in order to avoid delays. The method of the invention reduces to a minimum the number of trips the crew must make from one end of the array of geophones to the other. Since the array will often be a mile or more in length, this is an important advantage. It permits a profiling operation to be carried out much more rapidly than would otherwise be possible.

Figure 3:
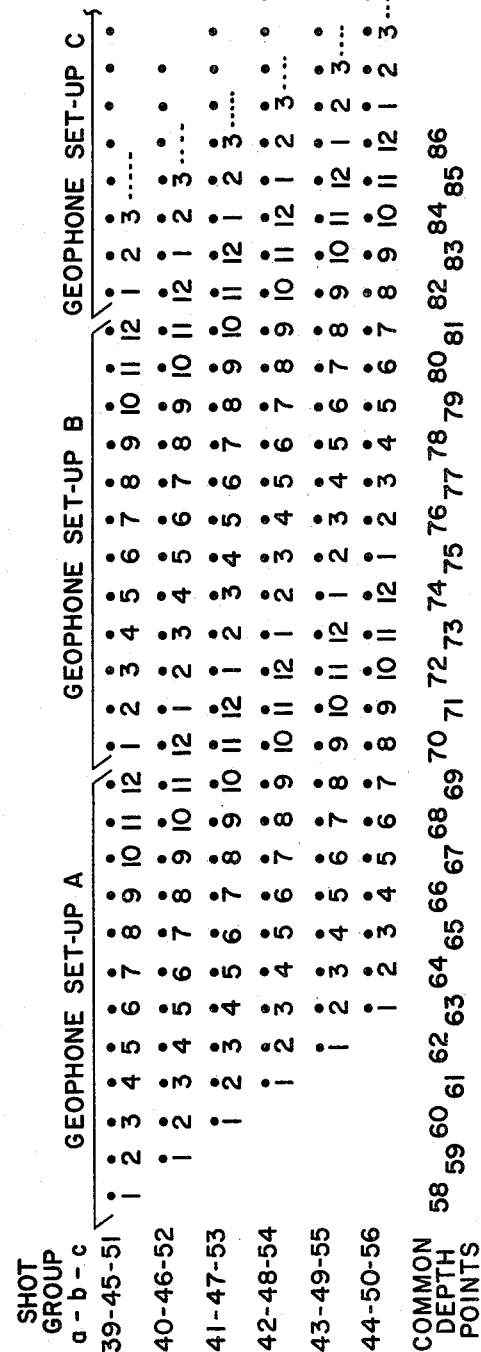
FIG. 3 illustrates the manner in which signals are combined to obtain common depth point summation.

The manner in which the data obtained as described above are combined for common depth point summation purposes is illustrated in FIG. 3 of the drawing. The numbered points in the figure represent seismic traces recorded during a seismic recording operation carried out in accordance with the invention. Three geophone setups, A, B, and C, were used. The shot points utilized in the operation are designated at the left of the figure. These are divided into three groups, shot groups $a$, $b$, and $c$. Shot group $a$ was used with geophone setup A, shot group $b$ with setup B, and shot group $c$ with setup C. The common depth points from which energy was reflected in response to impulses at the various shot points are designated at the bottom of the figure. This permits the common depth points signals to be readily grouped. It can be seen from FIG. 3 that, in geophone setup A, the signals represented by traces 8, 7, 6, 5, 4 and 3 which were recorded in response to impulses from shot points 39, 40, 41, 42, 43 and 44 respectively were all reflected from common depth point 65. Note that these traces reflect intermediate depth points in the same manner. The recorded traces representing these signals should therefore be combined to produce a composite trace. In like manner, traces 7, 6, 5, 4, 3 and 2 recorded during geophone setup B in response to impulses at shot points 45, 46, 47, 48, 49 and 50 respectively were reflected from common depth point 76 and should be combined. It is usually preferred to utilize only those depth points for which full multiple coverage is available and hence the data obtained at the beginning and at the end of the operation where less than six signals for each common depth point were obtained will not normally be used.

Conventional methods may be employed for combining the recorded signals to produce the desired summation traces. The normal corrections to compensate for geophone spread, differences in geophone elevation, and the like should be applied before the summation traces are prepared. If the signals were originally recorded upon magnetic tape, the preparation of the summation trace is merely a matter of playing back the proper signals and re-recording them as a single trace on photographic film. As mentioned earlier, variable area, variable density, or oscillographic recording methods may be used to prepare the final trace. If the original recording system was a photographic one, the corrections will normally be made and the signals added by means of a suitable transcriber. Such transcribers are now widely used by geophysicists throughout the petroleum industry and will be familiar to those skilled in the art.

It will be apparent from what has been said heretofore that a summation trace prepared in accordance with the invention will be based upon a series of individual traces which vary with respect to the distance between the shot point and the detector. If the geophones depicted in FIG. 1 of the drawing are spaced at intervals of 240 feet, for example, the first composite signal obtained will be based upon individual signals detected at distances of 2,400, 1,920, 1,440, 960, 480 and 0 feet from the shot point. The spread distances for the component signals making up the first twelve composite traces prepared with such a system are shown in the following table.

point and a geophone station are very near to one another are avoided. New shot holes can be drilled continuously, where explosive charges are used to initiate the impulses without interfering with the geophone cables and other equipment in use and therefore the overall operation can be carried out more rapidly.

The group of impulse points may be spaced either a given distance in advance of the geophone set-up or a given distance behind the geophones in a system such as that mentioned in the preceding paragraph. The general dip of the area in which the profiling operation is to be carried out will normally determine which system is used. It is preferable that the geophones be up-dip from the impulse points wherever possible, since the energy reflected from subsurface discontinuities under these conditions will travel to the geophones along more nearly vertical paths than if the geophones were down-dip from the impulse points.

The method of the invention is not restricted to the specific system set forth in the drawing and may be modified in several respects. Although in many cases it will be preferred to utilize evenly spaced geophone stations and impulse points, this is not necessary. By spacing the impulse points so that for each common depth point the impulse-to-detector distances vary in a uniform manner such that the difference between the squares of adjacent distances is a constant, improved cancellation of multiple reflections can be obtained. In like manner, the number of geophone stations and impulse points may be varied from the system depicted in the drawing. It is convenient to use twice as many geophone stations as

*Spread Distances With 240 Ft. Geophone Spacing*

| Summed Trace Number | Common Depth Point | Spread Distances of Component Traces in Feet | | | | | | | | | | |
|---|---|---|---|---|---|---|---|---|---|---|---|
| | | 2,400 | 2,160 | 1,920 | 1,680 | 1,440 | 1,200 | 960 | 720 | 480 | 240 | 0 |
| 1 | 63 | X | | X | | X | | X | | X | | X |
| 2 | 64 | | X | | X | | X | | X | | XX | X |
| 3 | 65 | | | X | | X | | X | | XX | | X |
| 4 | 66 | | | | X | | X | | XX | | XX | |
| 5 | 67 | | | | | X | | XX | | XX | | X |
| 6 | 68 | | | | | | XX | | XX | | XX | |
| 7 | 69 | | | | | X | | XX | | XX | | X |
| 8 | 70 | | | | | | XX | | XX | | XX | |
| 9 | 71 | | | | X | | XX | | XX | | XX | X |
| 10 | 72 | | | | X | | X | | XX | | XX | |
| 11 | 73 | | | X | | X | | X | | XX | | X |
| 12 | 74 | | X | | X | | X | | X | | XX | |

It will be noted from the above table that each trace is based upon signals detected over distances varying from zero to at least 1440 feet. This variation in spread distance results in considerably better reinforcement in reflected energy and cancellation of unwanted signal components than is obtained with many of the systems proposed for obtaining common depth point information.

In regions where it is suspected on the basis of surface conditions that the substrata are not horizontal, it will generally be preferred to use closer geophone spacings than in other areas. This will reduce the small amount of error engendered by the fact that all the reflections are not obtained from exactly the same points on the reflecting horizon. A greater number of geophones may also be used under these conditions, signals which are not reflected from common depth points being discarded during the summation process. Time delays may also be used during the summation process in order to compensate for the time displacement incurred because of depth point displacement.

As pointed out previously, the method of the invention is particularly effective where the group of impulse points is always spaced a preselected distance from the geophone setup. The variations in impulse-to-geophone distances are greater than when the impulse points and geophone stations are adjacent to one another as shown in FIG. 1 and hence noise cancellation is more effective. "Hole noises" sometimes encountered when an impulse impulse points but the method of the invention requires only that the length of the geophone array shifted each time the line of geophone stations is advanced be equivalent to the length of a group of impulse points. These and other modifications in similar vein will be readily apparent to those skilled in the art.

What is claimed is:

1. A seismic profiling method which comprises establishing a plurality of seismic detector stations in a line along the earth's surface; locating a first group of seismic impulse points in a line extending in the same direction as said line of detector stations, said first group of impulse points being spaced over a distance less than the length of said line of detector stations; successively initiating seismic impulses at each of said impulse points and recording energy reflected to each of said detector stations; extending said line of detector stations by transferring stations from one end of said line to the other, the distance said line is extended being equivalent to the length of said group of impulse points; extending said line of impulse points in the direction said line of detector stations was extended by locating a second group of impulse points similar to said first group beyond said first group; successively initiating seismic impulses at each impulse point in said second group and recording energy reflected to each station in said extended line of detector stations; and thereafter combining recorded signals reflected from common depth points.

2. A method as defined by claim 1 wherein each of said groups contains from two to twenty-four impulse points.

3. A method as defined by claim 1 wherein said line of detector stations contains from twelve to forty-eight stations.

4. A method as defined by claim 1 wherein each of said impulse points is located adjacent a detector station.

5. A method as defined by claim 1 wherein said impulse points precede said detector stations.

6. A method as defined by claim 1 wherein said impulse points follow said detector stations.

7. An improved seismic surveying system which comprises establishing a plurality of geophone stations along a straight line on the earth's surface; locating a lesser number of seismic impulse points along said line, the distance between adjacent points being equivalent to the distance between adjacent geophone stations and each point being adjacent to a geophone station; initiating a seismic impulse at each of said points in succession and recording energy reflected to each of said stations in response to each impulse; shifting geophone stations from one end of said line to the other in order to extend the line in the direction in which the surveying operation is to advance, the number of stations so shifted being equivalent to the number of impulse points previously located; establishing additional impulse ponts along said line in the direction said geophone stations were shifted, the additional points being equivalent in number to the earlier points and each being adjacent to a geophone station; successively initiating seismic impulses at each of said additional impulse points and recording energy reflected to each geophone station in said extended line of geophone stations; and thereafter combining recorded signals reflected from common depth points.

8. A system as defined by claim 7 wherein one-half the geophone stations in said line are shifted each time the line is extended.

9. A system as defined by claim 7 wherein said geophone stations are equally spaced along said line.

10. A common depth point seismic surveying system which comprises establishing a linear spread of geophone stations along a straight line on the earth's surface; locating a first group of seismic impulse points along said line at a predetermined distance from said geophone station spread, initiating a seismic impulse at each of said impulse points and recording energy detected at each of said geophone stations in response to each impulse; shifting said geophone station spread in one direction along said line by transferring stations from one end of said spread to the other, the distance said spread is shifted being equivalent to the length of said group of impulse points; locating a second group of impulse points along said line at said predetermined distance from said shifted geophone station spread; initiating a seismic impulse at each point in said second group of impulse points and recording energy detected at each geophone station in said shifted spread in response to each said impulse; continuing to shift said geophone station spread and establish additional groups of impulse points until the region to be surveyed has been traversed; applying corrections to the recorded signals; and thereafter combining signals reflected from common depth points.

11. A system as defined by claim 10 wherein each group of impulse points precedes said geophone station spread.

12. A system as defined by claim 10 wherein each group of impulse points follows said geophone station spread.

13. A system as defined by claim 10 wherein said impulse points are evenly spaced along said line.

References Cited in the file of this patent

UNITED STATES PATENTS

| | | |
|---|---|---|
| 2,117,365 | Salvatori et al. | May 11, 1938 |
| 2,321,450 | Athy et al. | June 8, 1943 |
| 2,596,463 | Barthelmes | May 13, 1952 |
| 2,732,906 | Mayne | Jan. 31, 1956 |
| 2,885,023 | Walker | May 5, 1959 |
| 3,005,184 | Savit | Oct. 17, 1961 |
| 3,016,970 | Allyn et al. | Jan. 16, 1962 |